(12) United States Patent
Eirinberg et al.

(10) Patent No.: US 12,273,480 B2
(45) Date of Patent: Apr. 8, 2025

(54) USER BEHAVIOR BASED NOTIFICATION INTERFACE

(71) Applicant: Snap Inc., Santa Monica, CA (US)

(72) Inventors: Dylan Shane Eirinberg, Venice, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 657 days.

(21) Appl. No.: 17/536,652

(22) Filed: Nov. 29, 2021

(65) Prior Publication Data

US 2022/0210261 A1 Jun. 30, 2022

Related U.S. Application Data

(60) Provisional application No. 63/133,169, filed on Dec. 31, 2020.

(51) Int. Cl.
| | | |
|---|---|---|
| *H04M 1/72427* | (2021.01) | |
| *A63F 13/533* | (2014.01) | |
| *A63F 13/92* | (2014.01) | |
| *H04M 1/72469* | (2021.01) | |

(52) U.S. Cl.
CPC ....... *H04M 1/72427* (2021.01); *A63F 13/533* (2014.09); *A63F 13/92* (2014.09); *H04M 1/72469* (2021.01); *H04M 2201/42* (2013.01)

(58) Field of Classification Search
CPC ........... H04M 1/72427; H04M 1/72469; A63F 13/533; A63F 13/92
USPC ...................................................... 455/414.1
See application file for complete search history.

(56) References Cited

U.S. PATENT DOCUMENTS

| | | |
|---|---|---|
| 2011/0092282 A1 | 4/2011 | Gary |
| 2017/0195338 A1 | 7/2017 | Richter et al. |
| 2018/0280812 A1 | 10/2018 | Vaccari et al. |
| 2018/0342106 A1* | 11/2018 | Rosado ................ G06Q 10/109 |

(Continued)

FOREIGN PATENT DOCUMENTS

| | | |
|---|---|---|
| CN | 116724343 | 9/2023 |
| WO | 2022146608 | 7/2022 |

OTHER PUBLICATIONS

"International Application Serial No. PCT/US2021/061477, International Search Report mailed Mar. 14, 2022", 4 pgs.

(Continued)

*Primary Examiner* — Ted M Wang
(74) *Attorney, Agent, or Firm* — Schwegman Lundberg & Woessner, P.A.

(57) ABSTRACT

A notification system is configured to perform operations that include: causing display of a graphical user interface at a client device associated with a user account, the graphical user interface including a menu element to display one or more notifications; accessing a list of user connections associated with the user account based on the causing display of the graphical user interface; determining that a user connection from among the list of user connections is engaged in a game session; and presenting a notification within the menu element in response to the determining that the user connection from among the list of user connections is engaged in a game session, the notification including a display of a user identifier associated with the user connection, and a game title associated with the game session.

20 Claims, 14 Drawing Sheets

(56) References Cited

U.S. PATENT DOCUMENTS

2020/0304626 A1* 9/2020 Phillips .................. G06Q 20/18

OTHER PUBLICATIONS

"International Application Serial No. PCT/US2021/061477, Written Opinion mailed Mar. 14, 2022", 7 pgs.
"International Application Serial No. PCT/US2021/061477, International Preliminary Report on Patentability mailed Jul. 13, 2023", 9 pgs.

* cited by examiner

USER BEHAVIOR BASED NOTIFICATION INTERFACE

CROSS-REFERENCE TO RELATED APPLICATION

This patent application claims the benefit of U.S. Provisional Patent Application No. 63/133,169, filed Dec. 31, 2020, entitled "USER BEHAVIOR BASED NOTIFICATION INTERFACE", which is incorporated by reference herein in its entirety.

BACKGROUND

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Users may maintain one or more accounts with various service providers, including, for example, online game networking systems and online social networking systems.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
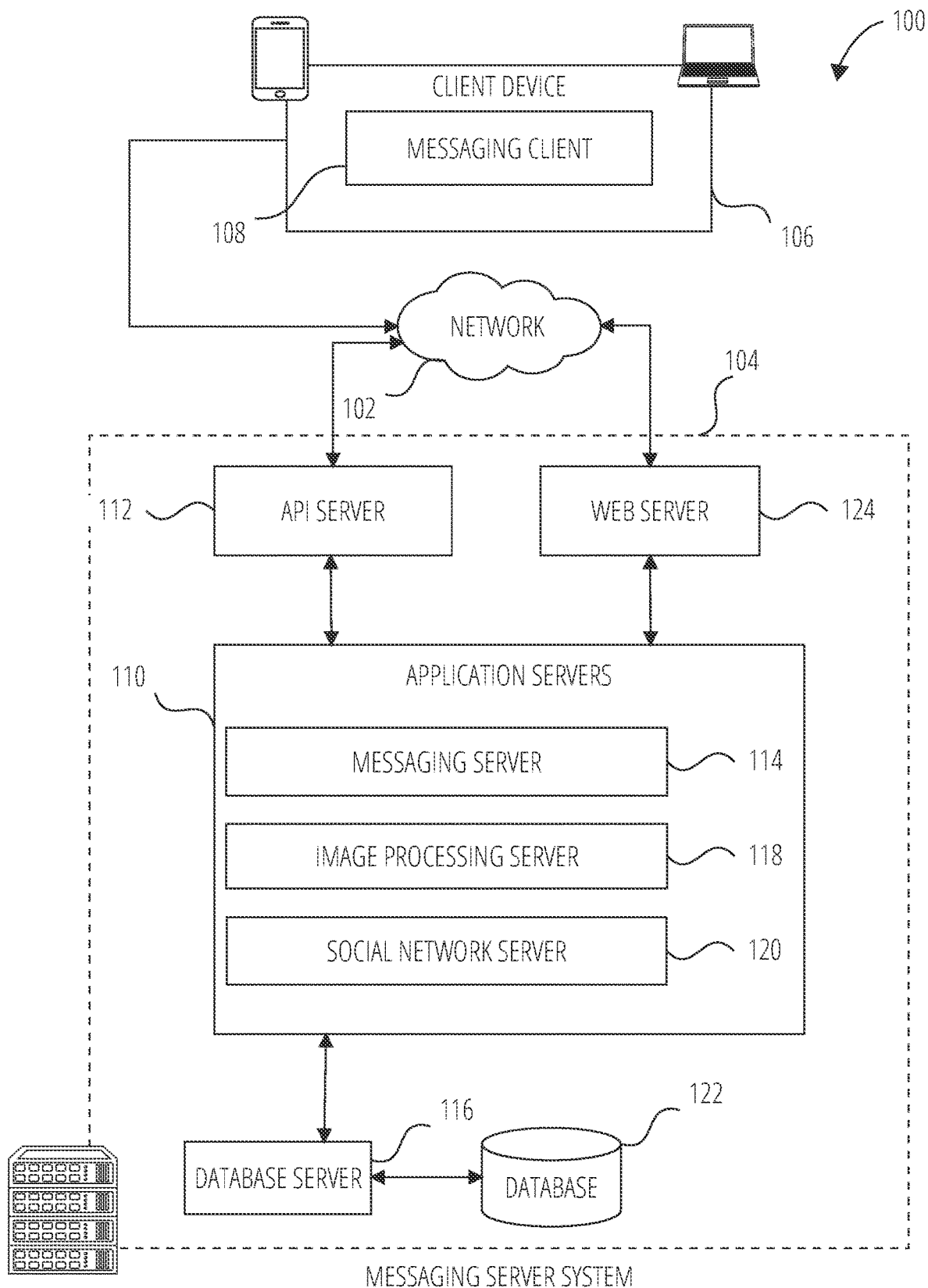
FIG. 1 is a diagrammatic representation of a networked environment in which the present disclosure may be deployed, in accordance with some examples.

As discussed above, many online computer games are operated on an online social network, wherein such a network allows parties to interact with one another through the computer games directly, whether to play the games or to retrieve game- or user-related information. While such platforms provide users with the ability to interact with one another while in a game session, a user may sometimes wish to have the ability to interact with users that are not currently engaged in the game session. Accordingly, the disclosed system provides functionality to enable users to join existing game sessions of user connections, or to invite/add friends and user connections to an ongoing game session in which the user is engaged.

According to certain example embodiments, a notification system is configured to perform operations that include: causing display of a graphical user interface at a client device associated with a user account, the graphical user interface including a menu element to display one or more notifications; accessing a list of user connections associated with the user account based on the causing display of the graphical user interface; determining that a user connection from among the list of user connections is engaged in a game session; and presenting a notification within the menu element in response to the determining that the user connection from among the list of user connections is engaged in a game session, the notification including a display of a user identifier associated with the user connection, and a game title associated with the game session.

In some embodiments, a user may further provide an input to select the notification presented within the menu element of the GUI. For example, the user may provide a tactile input that selects the notification via a client device. Responsive to receiving the input that selects the notification, the notification system may cause a corresponding gaming system associated with the client device to launch the game session at the client device. Accordingly, launching the game session may include causing the gaming system to add a user of the client device to an ongoing game session associated with the user connection, such that the user may engage in the game session simultaneously with the user connection in real-time.

In some embodiments, the notification system may provide functionality to enable a user engaged in a game session to generate and distribute invitations to join an ongoing game session that the user is engaged in. For example, a user engaged in a game session may provide an input to select one or more user identifiers from among a list of user connections associated with the user (i.e., a friend list), wherein the friend list may be presented in a menu element at the client device. Responsive to receiving the input that selects the one or more user identifiers from within the menu element, the notification system may generate invitations to join the user in the ongoing gaming session, wherein the invitations may be presented as messages that comprises a notification element which is presented at client devices corresponding with user accounts associated with the selected one or more user identifiers.

In some embodiments, notifications and invitations may be generated and presented based on user preferences. For example, a user may define one or more privacy preferences to be associated with a user profile. The notification system may access a privacy preference associated with a user profile in order to determine attributes of a notification that may be displayed to a user connection based on the user's behavior. For example, a privacy preference may provide that only certain user connections from a list of user connections are to be notified of various attributes of the user's game activity (i.e., what game the user is playing, whether or not the user is playing a game, etc.), or that all or no users may be notified of such activities.

In some embodiments, a notification generated based on a user behavior (i.e., engagement in a game session) may be generated based on a user identifier associated with the user, as well as attributes of the game session itself. For example, in some embodiments, the user identifier may include a graphical avatar (e.g., a Bitmoji), wherein the graphical avatar comprises a plurality of graphical elements and features. The notification generated by the notification system may include a display of the graphical avatar. In some embodiments, the notification may generate a notification icon based on the user identifier and one or more attributes of the game session. For example, attributes of the game session may include a type of game being played (i.e., sports, racing, puzzle, adventure, etc.), as well as a user's score within the game session, and any achievements unlocked by the user in the gaming session.

As an illustrative example, Player A (i.e., a user) may enter into a game via a "Games Destination" menu presented at a client device, wherein the Games Destination menu may also include a display of features for all friends associated with that game session. Once in a session, all members of the group can continuously invite friends to join. In certain example embodiments, games that are initiated through the Games Destination menu may make player activity in the session visible to their friends via player controlled privacy settings, wherein the play controlled privacy setting enable a user to define privacy options to a plurality of player activities. For example, if a player activity is set to public, then the user's player activity may be presented to other users as notifications.

In some embodiments, a user may access the Games Destination menu via several entry points, and through the Games Destination menu may access privacy settings, invitations, notifications indicating what user connections are actively engaged in a gaming session, as well as a games list of all available games. For example, the user may select a game via the games list, and after selecting a game for the first time, an "activity prompt" may be presented to onboard the user to the concept of their privacy settings and features of the disclosed system.

While engaged in a gaming session of the selected game, the user can invite friends to join the gaming session via a Games Actions menu which may be presented at the client device. After inviting friends, a conversation feed may be created and indexed in a memory location which the user can access through inputs. Inviting a friend to a game session causes the notification system to send a push notification that provide an identification of a corresponding game title, as well as a user identifier associated with the user. When a friend joins a game session, either by invitation, or through accessing a game session through a Games Destination menu, a notification may be presented to the user. Accordingly, a user may be presented with public sessions of their own user connections within a notification menu, and may join the corresponding public gaming session by providing an input to select the notification.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
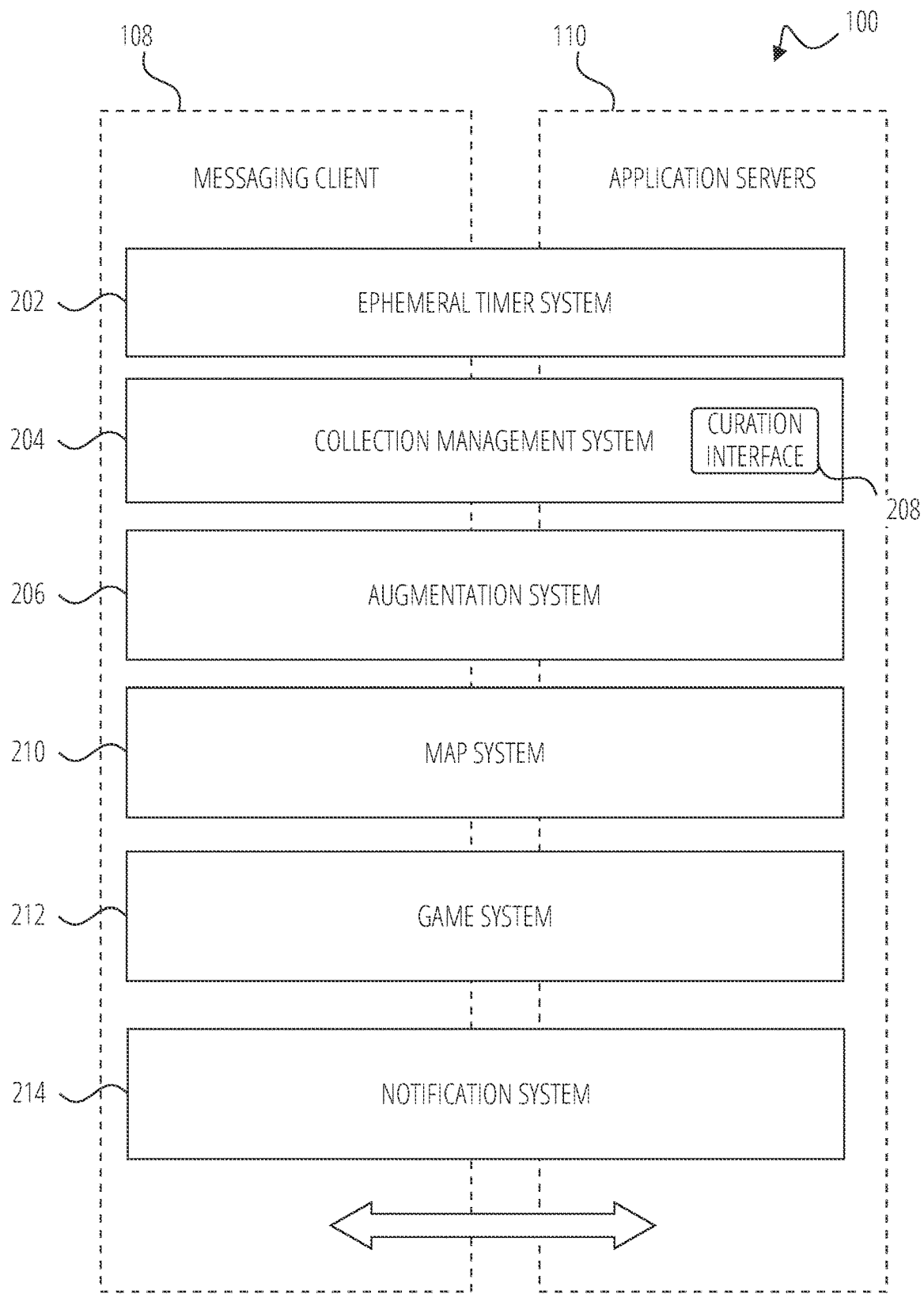
FIG. 2 is a diagrammatic representation of a messaging system, in accordance with some examples, that has both client-side and server-side functionality.

FIG. 2 is a block diagram illustrating further details regarding the messaging system according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a notification system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The notification system 214 provides functions related to generating and causing display of notifications based on user behaviors, according to certain example embodiments.

Figure 3:
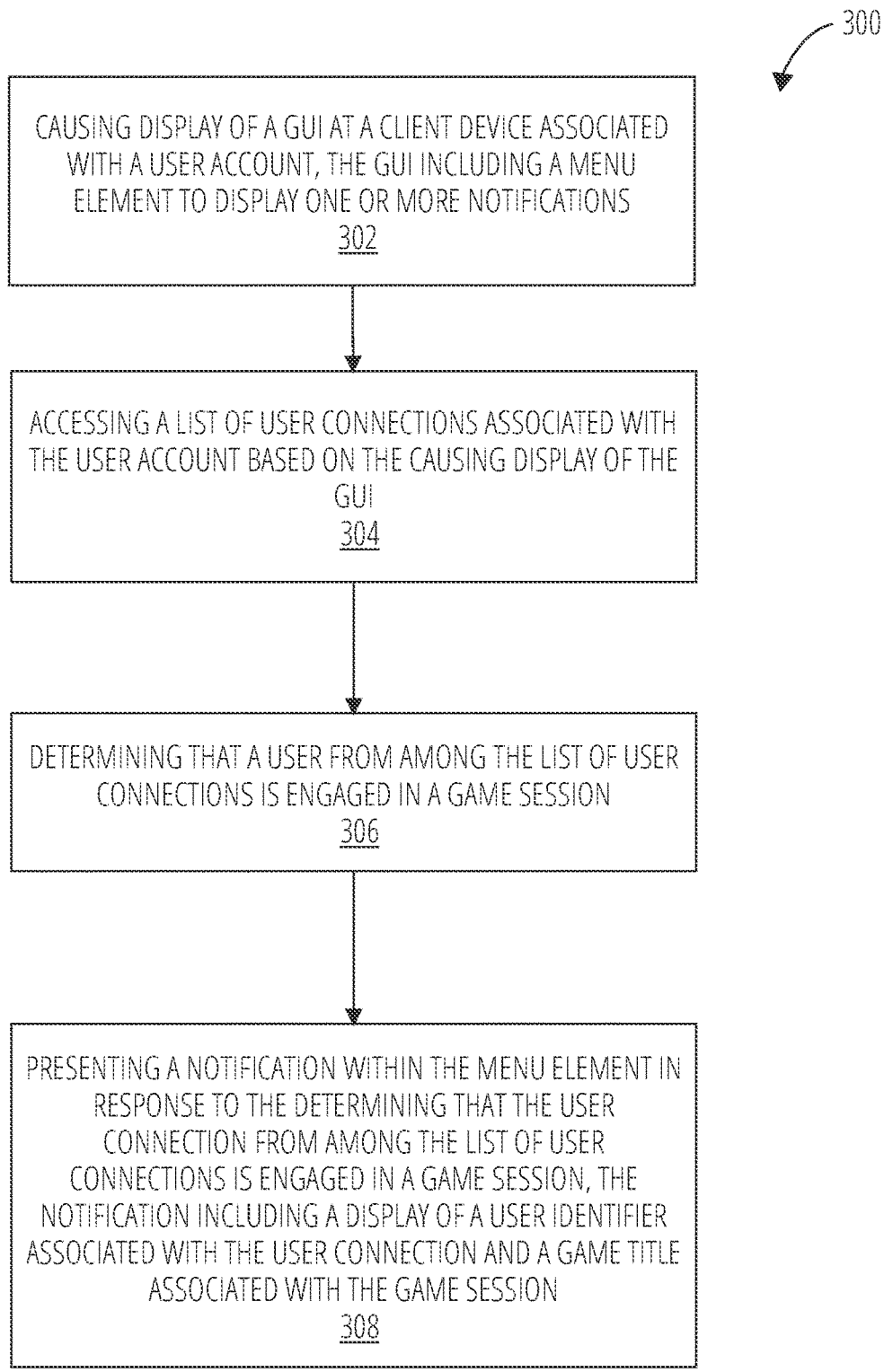
FIG. 3 is a flowchart depicting a method for presenting a notification within a menu element based on user behavior, in accordance with one embodiment.

FIG. 3 is a flowchart depicting a method 300 for presenting a notification within a menu element based on user behavior, in accordance with one embodiment. Operations of the method 300 may be performed by the systems described above with respect to FIG. 2. As shown in FIG. 3, the method 300 comprises one or more operations 302, 304, 306, and 308.

Figure 8:
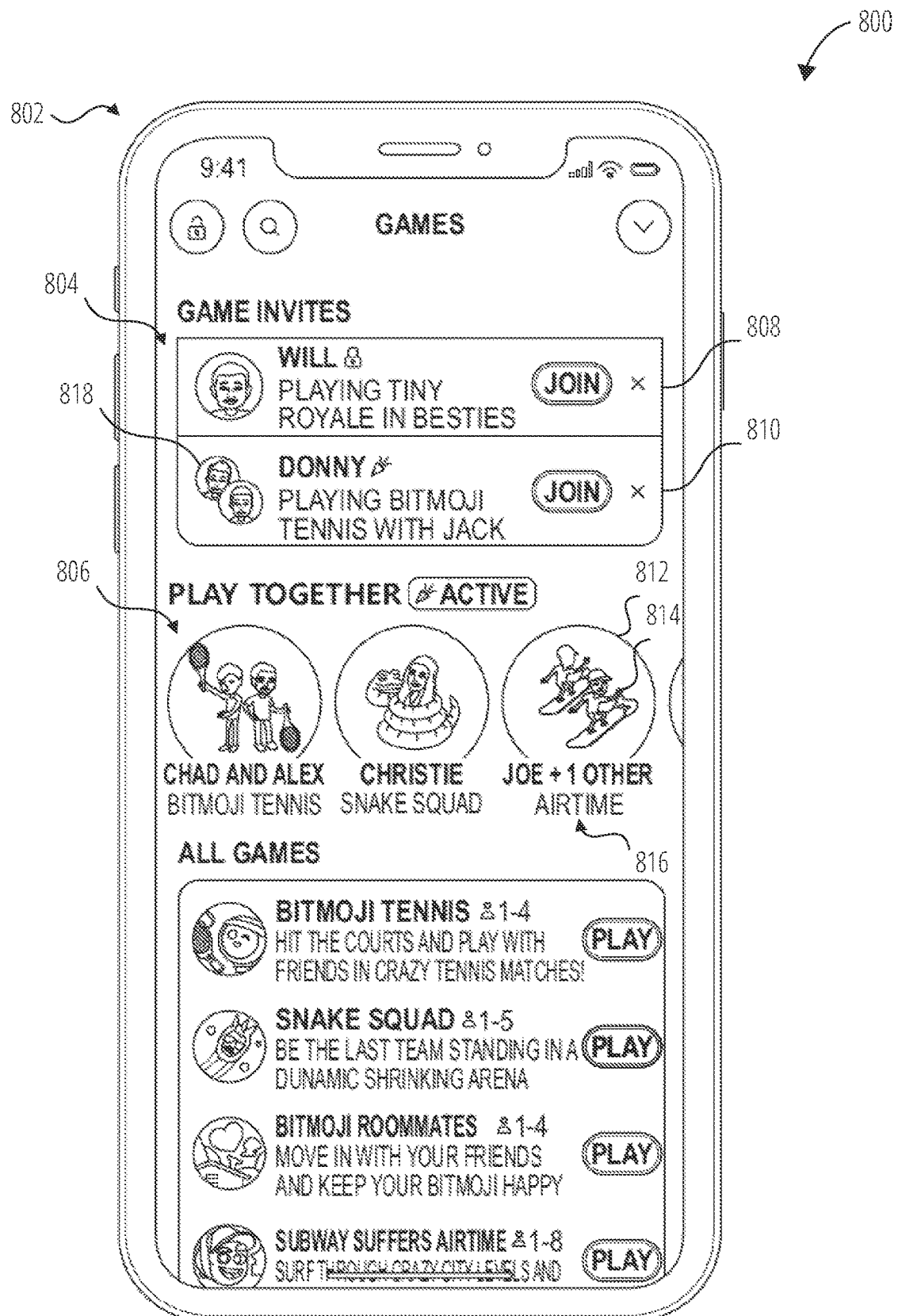
FIG. 8 is an interface diagram depicting a graphical user interface (GUI) that includes a menu element to display notifications based on user behavior, in accordance with one embodiment.

At operation 302, the notification system 214 causes display of a GUI at a client device 106, wherein the client device 106 is associated with a user account, wherein the user account is associated with a list of user connections. According to certain embodiments, the GUI comprises a display of a menu element to display one or more notifications, as depicted in FIG. 8.

At operations 304, the notification system 214 accesses the list of user connections associated with the user account. For example, in some embodiments, responsive to receiving an input that causes the notification system 214 to display the GUI, the notification system 214 may access the list of user connections associated with the user account in order to identify user activities that may be performed by users among the list of user connections.

At operations 306, the system determines that a user from among the list of user connections is engaged in a user activity that comprises user activity attributes. The user activity attributes may for example indicate that the user is engaged in a game session of a game, wherein the game session comprising game session attributes.

At operation 308, the notification system 214 generates and causes display of a notification within the menu element at the client device 106, wherein the notification comprises a display of the activity attributes of the user, and a user identifier associated with the user. For example, the notification may comprise an indication of a game title associated with the game session, attributes associated with the game session, such as how long the user has been engaged in the game session, as well as a user identifier associated with the user engaged in the game session.

Figure 4:
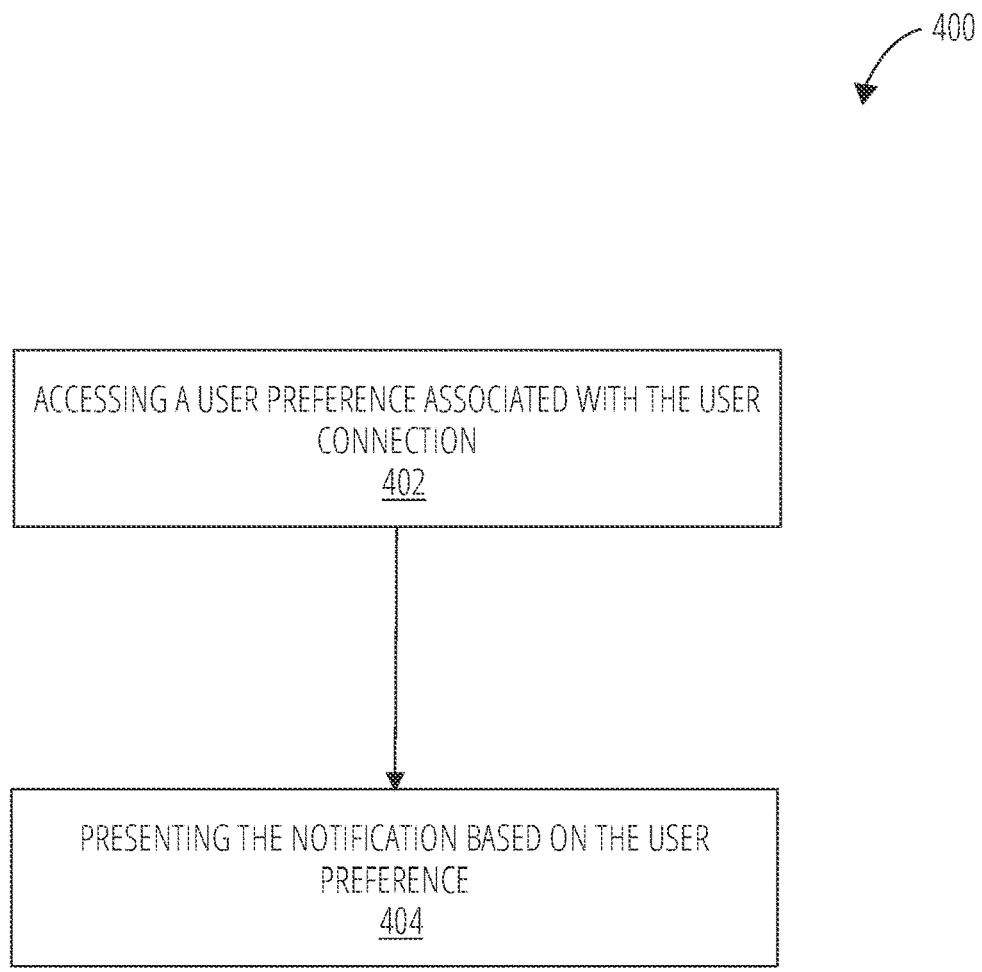
FIG. 4 is a flowchart depicting a method for presenting a notification within a menu element based on user behavior, in accordance with one embodiment.

FIG. 4 is a flowchart depicting a method 400 for presenting a notification within a menu element based on user behavior, in accordance with one embodiment. Operations of the method 400 may be performed by the systems described above with respect to FIG. 2. As shown in FIG. 4, the method 400 comprises one or more operations 402 and 404 which may be performed as a precursor or subroutine of one or more of the operations described above relative to FIG. 3.

At operation 402, responsive to operation 304 in which the notification system 214 accesses a list of user connections associated with a user of the client device 106, the notification system 214 accesses user preferences associated with the users among the list of user connections. For example, the user preferences may include user privacy preferences that identify privacy preferences for one or more user activities.

At operation 404, responsive to determining that a user connection from among the list of user connections is engaged in a user activity, as in operation 306 of the method 300, the notification system 214 generates a notification based on the privacy preferences of the user connection, wherein the privacy preferences define a privacy option for a given user activity. For example, the privacy preference may indicate that gaming activities performed by the user may be shared with a specific subset of users from among a list of user connections, or that only a portion of user activity attributes may be presented in a notification to a user of the client device 106.

Figure 5:
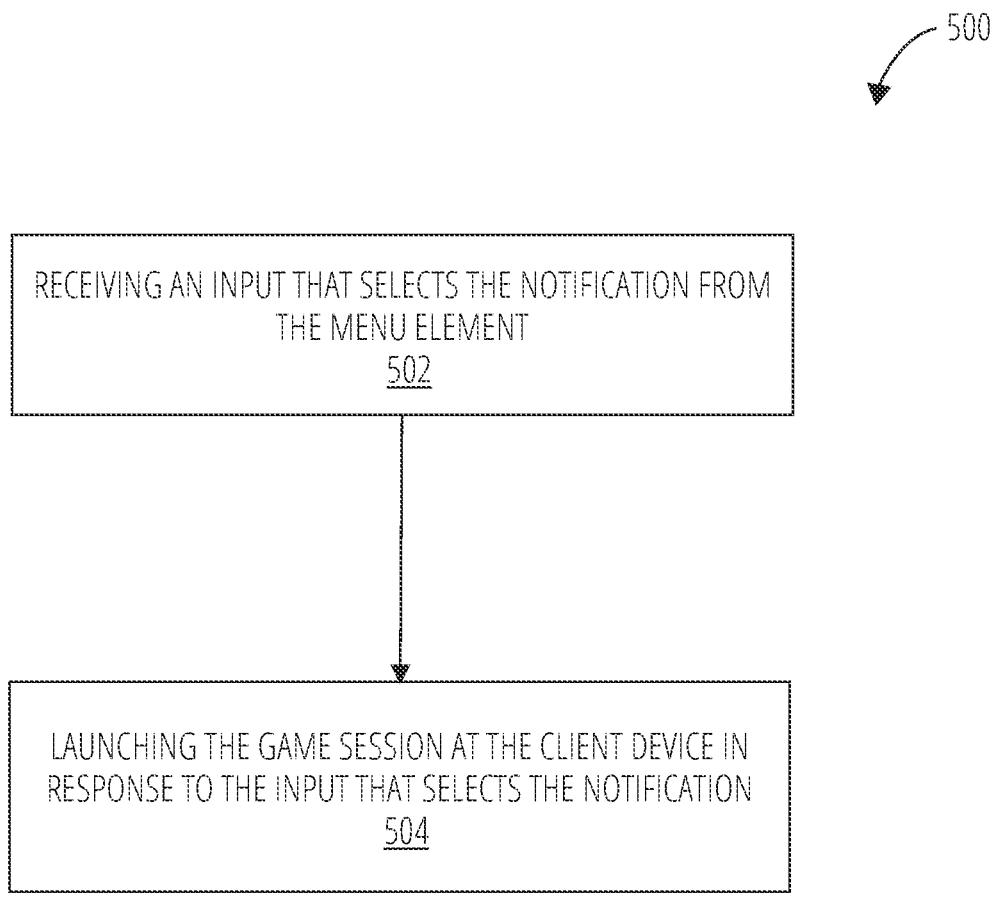
FIG. 5 is a flowchart depicting a method for launching a game session at a client device, in accordance with one embodiment.

FIG. 5 is a flowchart depicting a method 500 for launching a game session at a client device, in accordance with one embodiment. Operations of the method 500 may be performed by the systems described above with respect to FIG. 2. As shown in FIG. 5, the method 500 comprises one or more operations 502 and 504 which may be performed as a precursor or subroutine of one or more of the operations described above relative to FIG. 3 and FIG. 4.

Operation 502 may be performed as a subroutine of operation 308 of FIG. 3, and operation 404 of FIG. 4, in which the notification system 214 generates and causes display of a notification that indicates a user activity of a user engaged in a gaming session. At operation 502, the notification system 214 receives an input from the client device 106, wherein the input comprises a selection of a notification. For example, the notification may comprise a display of a user identifier and a game title associated with a gaming session.

Responsive to receiving the selection of the notification, at operation 504, the game system 212 may cause the client device 106 to execute a game identified by the game title indicated by the notification. In some embodiments, execution of the game identified by the game title may include adding the user to the existing gaming session executed by the user connection identified by the user identifier presented within the notification.

Figure 6:
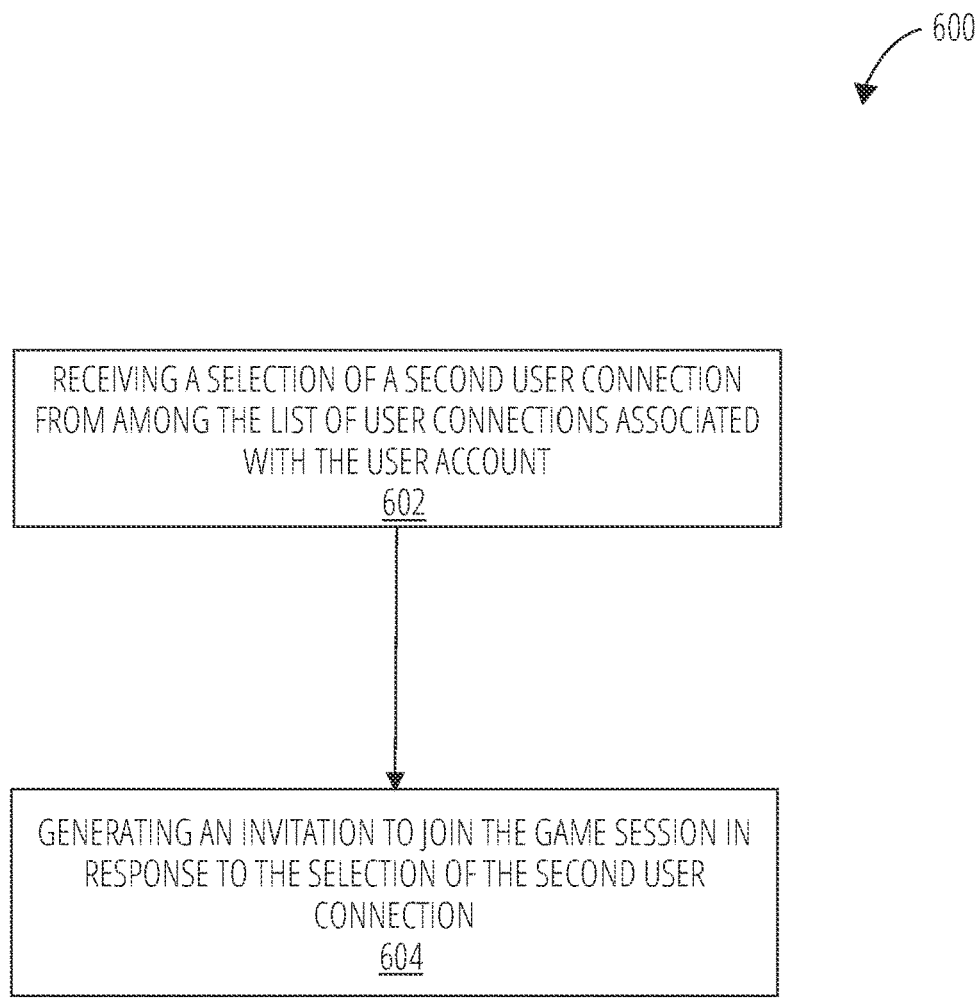
FIG. 6 is a flowchart depicting a method for generating an invitation to join a game session, in accordance with one embodiment.

FIG. 6 is a flowchart depicting a method 600 for generating an invitation to join a game session, in accordance with one embodiment. Operations of the method 600 may be performed by the systems described above with respect to FIG. 2. As shown in FIG. 6, the method 600 comprises one or more operations operation 602 and 604 which may be performed as a precursor or subroutine of one or more of the operations described above relative to FIG. 3, FIG. 4, and FIG. 5. In some embodiments, the method 600 may be performed by a user while the user is actively engaged in a game session.

At operation 602, while the user is engaged in a game session, the user may provide an input that selects one or more user identifiers associated with user connections of the user from among a list of user connections.

At operation 604, responsive to receiving the input that selects the one or more user identifiers, the notification system 214 generates an invitation to join the game session of the user, wherein the invitation includes a display of a game title associated with the game session, as well as a user identifier associated with the user of the client device 106. In some embodiments, the invitation may be presented as a notification, wherein a recipient of the notification may provide an input to select the notification in order to join the game session.

Figure 7:
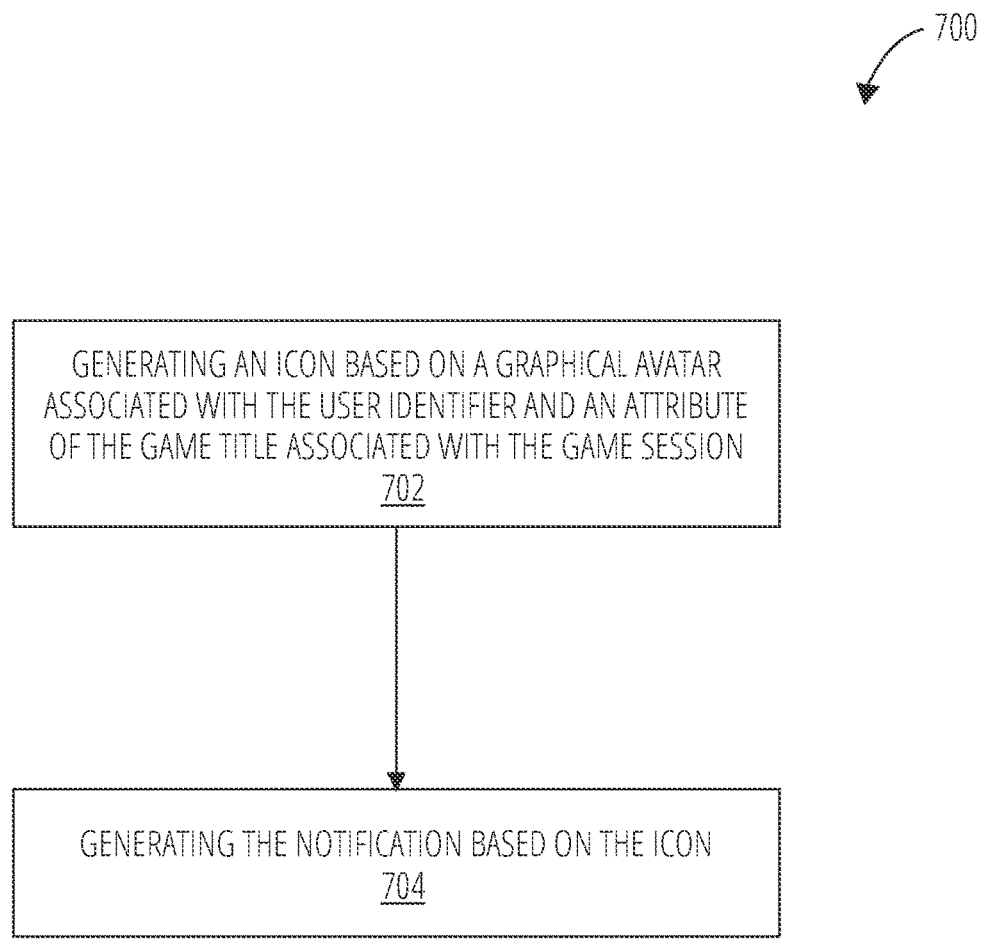
FIG. 7 is a flowchart depicting a method for generating a notification based on a graphical avatar associated with a user identifier, in accordance with one embodiment.

FIG. 7 is a flowchart depicting a method 700 for generating a notification based on a graphical avatar associated with a user identifier, in accordance with one embodiment. Operations of the method 700 may be performed by the systems described above with respect to FIG. 2. As shown in FIG. 7, the method 700 comprises one or more operations operation 702 and 704 which may be performed as a precursor or subroutine of one or more of the operations described above relative to FIG. 3, FIG. 4, and FIG. 5.

At operation 702, the notification system 214 generates an icon based on a graphical avatar associated with a user identifier and an attribute of a user activity, such as a user activity type. For example, the user activity type may include a game session, wherein the game session comprises a game title.

In some embodiments, operation 702 may be performed by the notification system 214 responsive to a user of a client device 106 selecting one or more user identifiers while the user is engaged in a game session. Similarly, in some embodiments, the notification system 214 may perform operation 702 as a subroutine of operation 306 of the method 300, wherein the notification system 214 determines that a user connection of the user is engaged in a gaming session.

Figure 9:
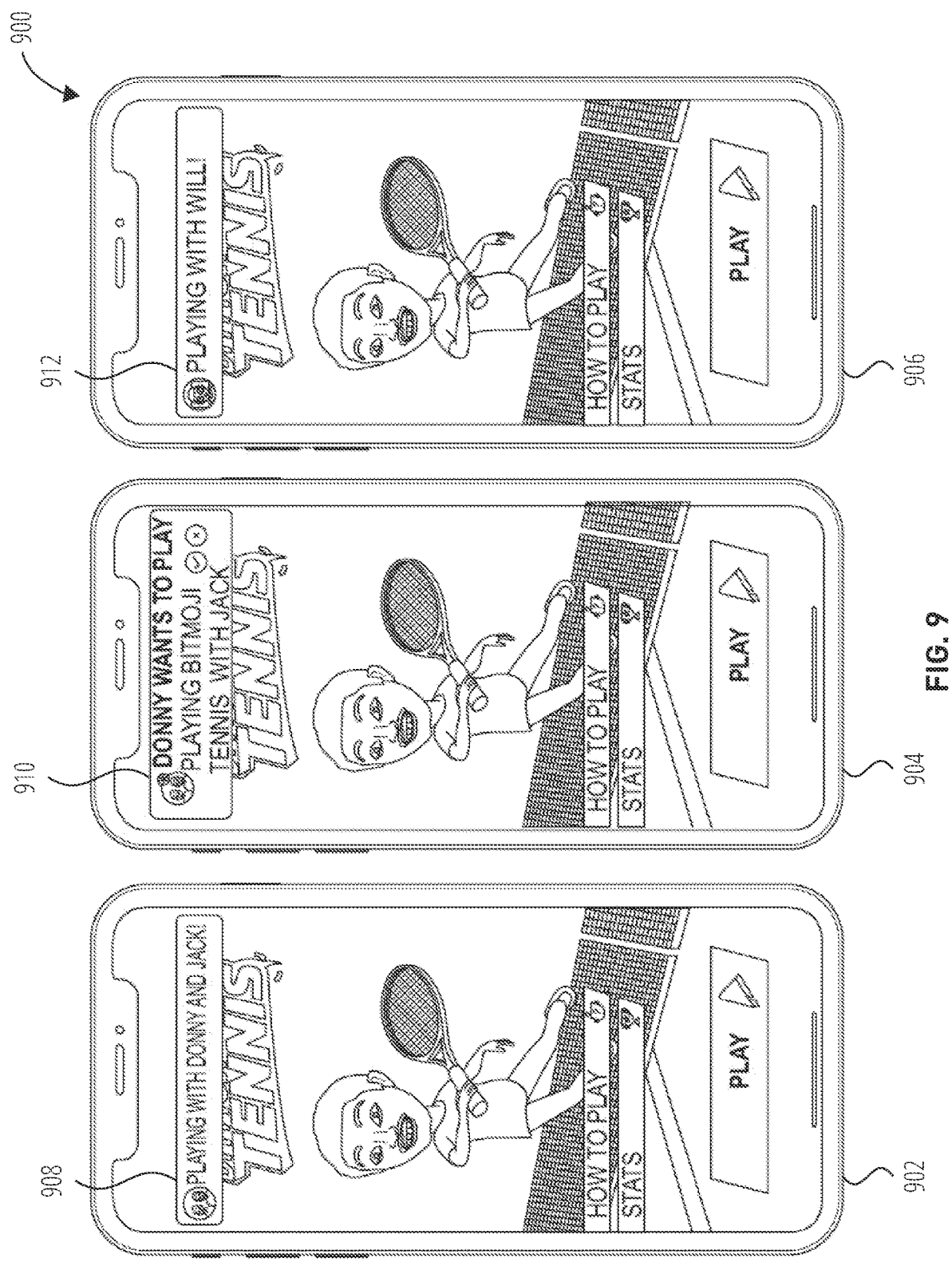
FIG. 9 is an interface diagram depicting notifications presented within a GUI, in accordance with one embodiment.

At operation 704, the notification system 214 generates a notification based on the icon, as depicted in FIG. 8 and FIG. 9. For example, the notification may be presented among a set of notifications, as seen in the menu elements 804 and 806 of FIG. 8.

FIG. 8 is an interface diagram 800 depicting a GUI 802 presented at a client device 106 that includes menu elements 804 and 806 to display notifications based on user behavior, in accordance with one embodiment. As seen in FIG. 8, the GUI 802 comprises a menu element 804 and a menu element 806, configured to display one or more notifications, such as notifications 808, 810, and 812.

For example, as discussed in FIG. 3, responsive to determining a user activity of a user connection of a user associated with the client device 106, the notification system 214 may generate a notification to be presented within the menu element 806. For example, as seen in FIG. 8, the user activity may include an indication that one or more users connected to a user of the client device 106 are engaged in a game session. Accordingly, responsive to determining that a user connection of the user is engaged in a game session, the notification system 214 generates and causes display of a notification, such as the notification 812 at a position within the menu element 806, wherein one or more attributes of the notification may be based on attributes of the user activity (i.e., game session), as well as attributes of the user engaged in the game session themselves, such as an identifier 814 associated with the user. As seen in FIG. 8, the notification 812 may comprise a display of an identifier 814 associated with a user connection of the user, as well as a title 816 associated with the game session.

In some embodiments, the menu element 804 may be configured to display notifications that comprise an invitation to join a gaming session which may be received by a user of the client device 106. For example, the notifications 808 and 810 may comprise a display of one or more user identifiers, such as the user identifier 818. Accordingly, a user may provide an input to select a notification presented within the menu element 804 in order to join the active game session.

In some embodiments, the notification system 214 may generate a custom identifier, such as the identifier 814, based on attributes of a user identifier associated with the user, and attributes of a game associated with the notification. For example, as seen in FIG. 8, the notification 812 may comprise a display of a customized identifier 814, wherein the identifier 814 comprises a user identifier and one or more graphical features associated with a game associated with the notification 812.

In some embodiments, a sorting of the notifications presented in the menu elements 804 and 806 may be based on one or more factors that include: attributes of the gaming session; a relationship status of the user of the client device and one or more users associated with a given notification; as well as a communication history associated with the user of the client device and the one or more users associated with a given notification.

In some embodiments, the notifications may be presented in a sort order based on a time in which the notification is received at the client device 106, such that newest notifications are displayed at one end of the menu element, while oldest notifications are presented at another end of the menu element.

In some embodiments, the notifications may be presented in a sort order based on a frequency in which a user of the client device 106 engages in social network activities with one or more users associated with a given notification. For example, user connections that a user most frequently engages with (i.e., communications with, visits profile page, has common likes and interests) may be presented at one end of the menu element, while users that a user less frequently engages with may be presented at the other end of the menu element.

In some embodiments, the notifications may be presented in a sort order based on how frequently a user of the client device 106 plays a game associated with a notification. For example, a notification pertaining to a game that the user plays more frequently plays may be presented at one end of the menu element, while a notification pertaining to a game that the user plays less frequently may be presented at the other end of the menu element.

FIG. 9 is an interface diagram 900 depicting notifications presented within a GUI, in accordance with one embodiment. The interface diagram 900 depicted in FIG. 9 may comprise a set of interfaces 902, 904, and 906, each depicting various notifications 908, 910, and 912 that may be presented at a client device 106, according to certain example embodiments.

As seen in the interface diagram 900, a user of the client device 106 may execute and launch a game (i.e., "Tennis"). Responsive to launching the game at the client device 106, the notification system 214 may determine that one or more user connections of the user are also engaged in a gaming session of the same game in order to cause display of a notification, such as the notifications 908 and 912. Accordingly, the user of the client device 106 may provide an input to select the notification 908 or 912 in order to join an ongoing gaming session. As seen in the interfaces 902 and 906, the notifications 908 and 912 may comprise a display of one or more user identifiers associated with the user connections of the user of the client device 106.

Similarly, as depicted in interface 904, a user may received an invitation to join a game, wherein the invitation may be presented to the user within the notification 910. According to certain embodiments, the notification 910 may include a display of one or more user identifiers associated with the invitation.

Figure 10:
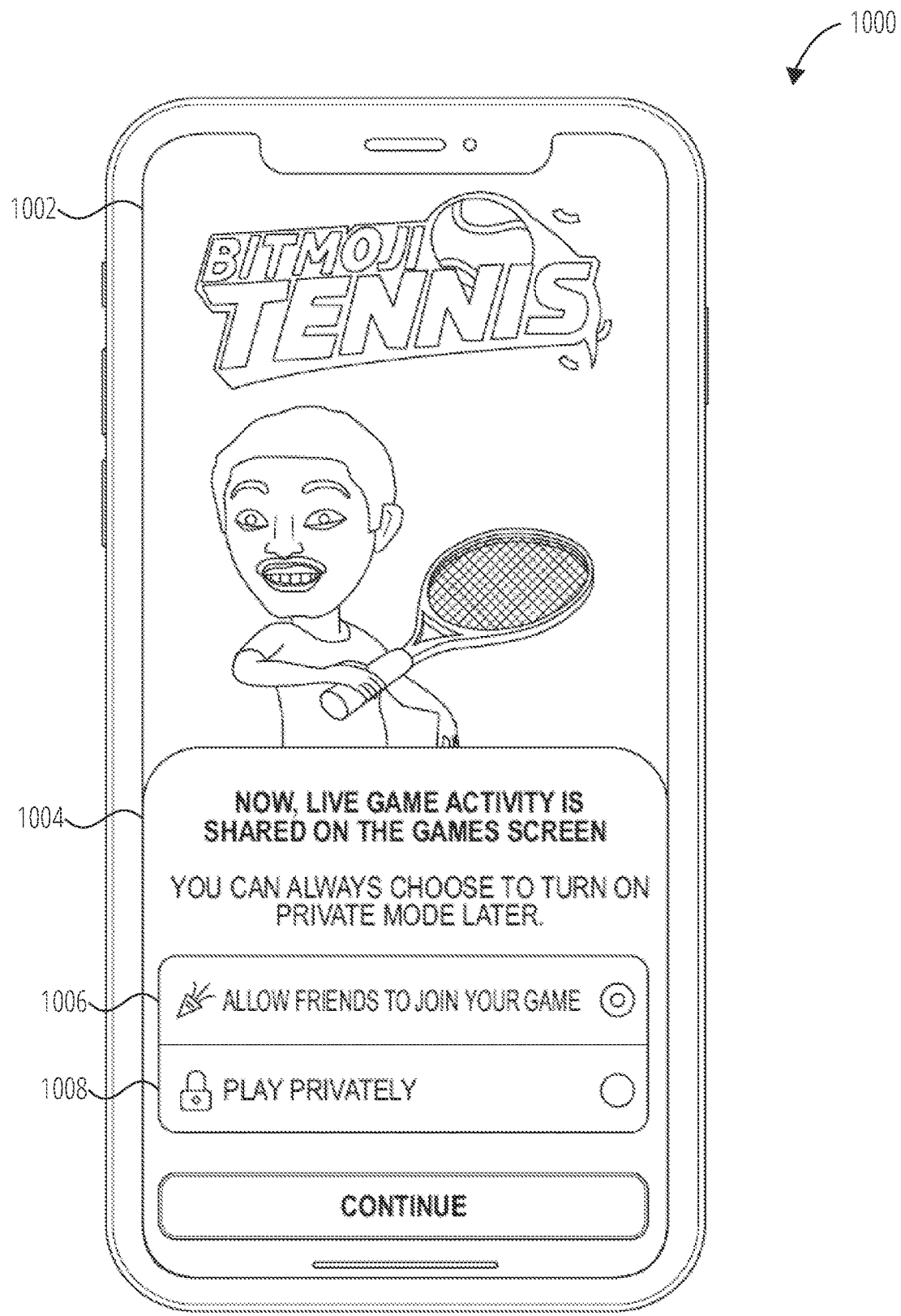
FIG. 10 is an interface diagram depicting notifications presented within a GUI, in accordance with one embodiments

FIG. 10 is an interface diagram 1000 depicting a GUI 1002 that includes a menu element 1004, in accordance with one embodiment. As seen in the GUI 1002, the menu element 1004 may comprise a display of a set of menu options, such as the privacy options 1006 and 1008. Accordingly, the notification system 214 may present the menu element 1004 within the GUI 1002 responsive to the user of the client device 106 executing a game (i.e., "Tennis"). Accordingly, a user of the client device 106 may provide inputs to select from among the options presented within the menu element 1004 in order to define privacy options associated with a user account of the user.

For example, in some embodiments, a user of the client device 106 may provide inputs to select from among the menu options presented within the menu element 1004 in order to define privacy options of the user as it pertains to the game. Accordingly, by specifying that the user wishes to play privately (by selecting the menu option 1008), the notification system 214 may prevent notifications indicating the user activity of the user as it pertains to the game to be displayed to one or more user connections associated with the user. Similarly, by selecting the menu option 1006, the notification system 214 may present an indication of the user's activity to one or more user connections of the user.

Figure 11:
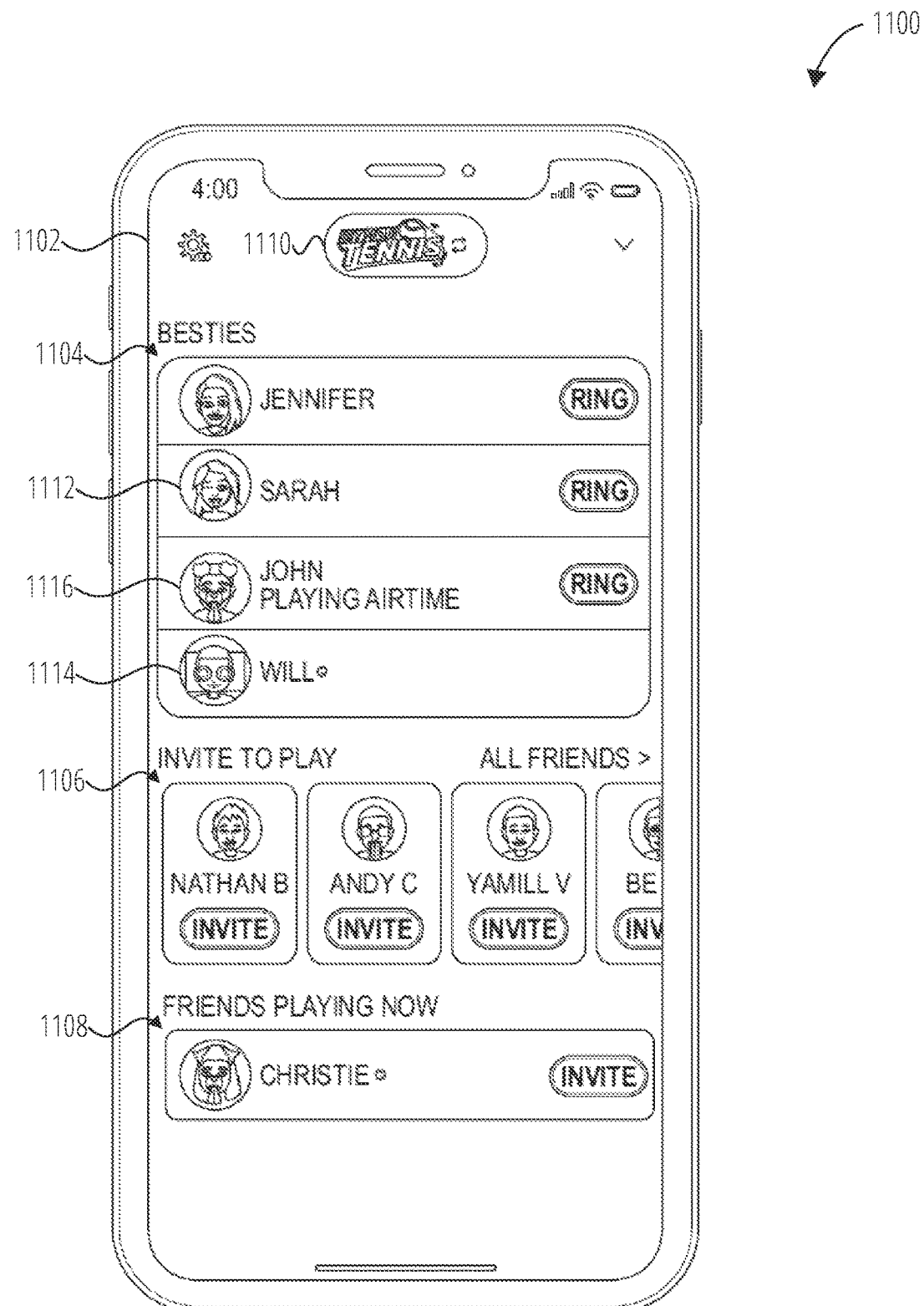
FIG. 11 is an interface diagram depicting a GUI that includes a menu element to display notifications based on user behavior, in accordance with one embodiment.

FIG. 11 is an interface diagram 1100 depicting a GUI 1102 that includes menu elements 1104, 1106, and 1108, in accordance with one embodiment. A user of the client device 106 may access the GUI 1102 via a game menu associated with a game executed by the client device 106. Accordingly, the GUI 1102 may comprise a presentation of a set of menu elements to display notifications that pertain to the game.

For example, the menu element 1104 may comprise a display of a set of user identifiers, such as the user identifier 1112, wherein the set of user identifiers represent one or more user connections associated with the user of the client device 106. In some embodiments, the notification system 214 may present the user identifier of a user based on a privacy option or user status associated with the user. For example, as seen in FIG. 11, the user identifier 1114 may be presented within the GUI 1102 based on a privacy option or user status associated with the user (i.e., "do not disturb," etc.). Similarly, the user identifier 1116 may include an indication of a user activity performed by the user in real-time (i.e., "playing airtime"). In some embodiments, the menu element 1104 may comprise a display of a users "close connections," wherein the close connections are identified based on a relationship status with a user of the client device 106, or in some embodiments, responsive to a determination that a user communicates with the user of the client device 106 a threshold amount (i.e., a number of messages sent per week or per day, or a period of time). For example, responsive to determining that a user sends a threshold number of messages to the user of the client device 106 in a week, the notification system 214 may elevate the user to a "close connection," and present a corresponding user identifier associated with the user within the menu element 1104.

The menu element 1106 may comprise a display of user identifiers associated with the user connections associated with the user of the client device 106. In some embodiments, the user connections presented in the menu element 1106 may be ranked or otherwise sorted based on one or more attributes, such as a frequency of page visits, or frequency of messages sent or received between the user of the client device 106, and a user among the list of user connections.

In some embodiments, the GUI 1102 may include a menu element 1108, wherein the menu element 1108 is configured to display users actively engaged in a gaming session associated with the game that corresponds with the GUI 1102 (i.e., "Tennis").

Machine Architecture

Figure 12:
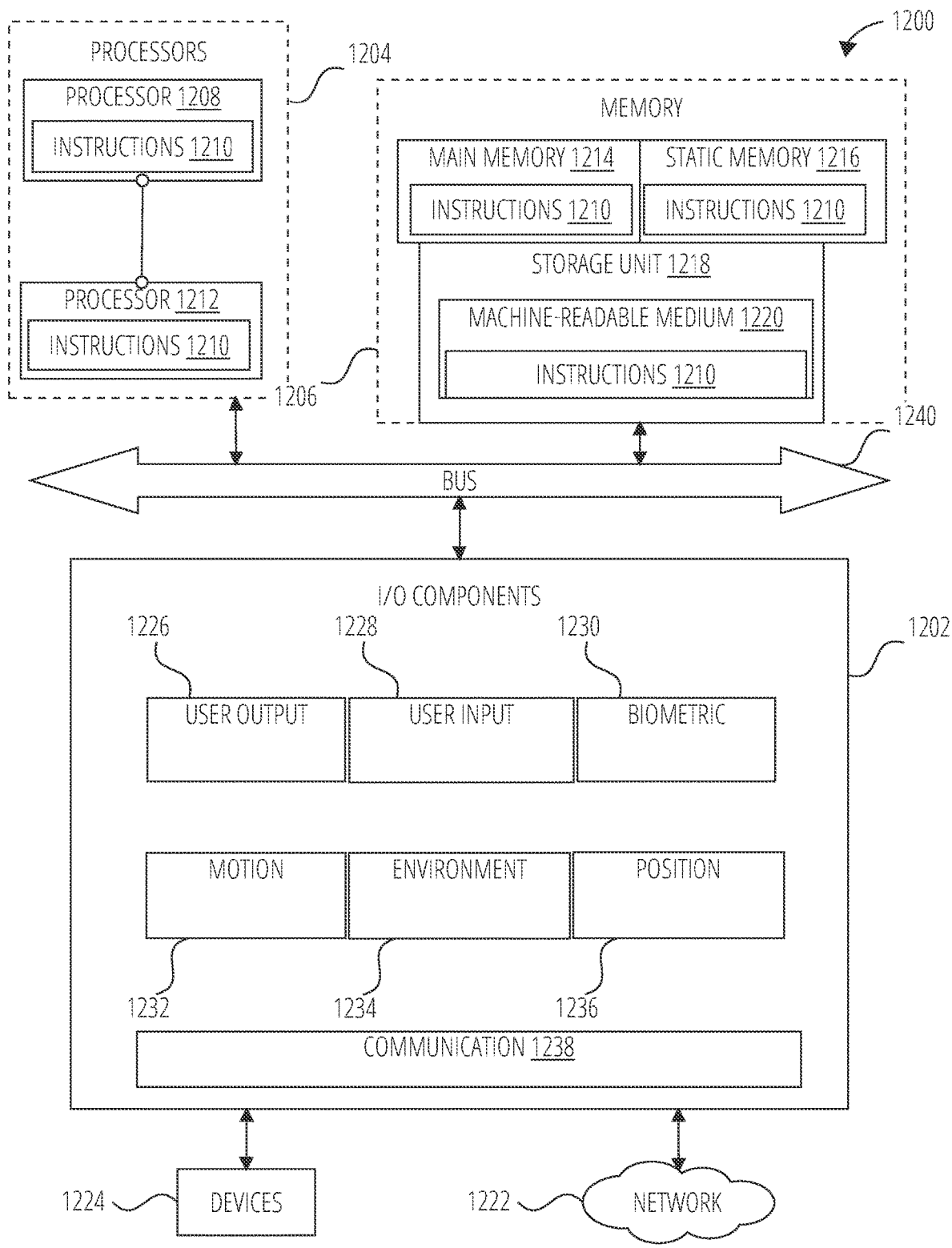
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the client device 106 or any one of a number of server devices forming part of the messaging server system 104. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 638, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the Processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface Component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Software Architecture

Figure 13:
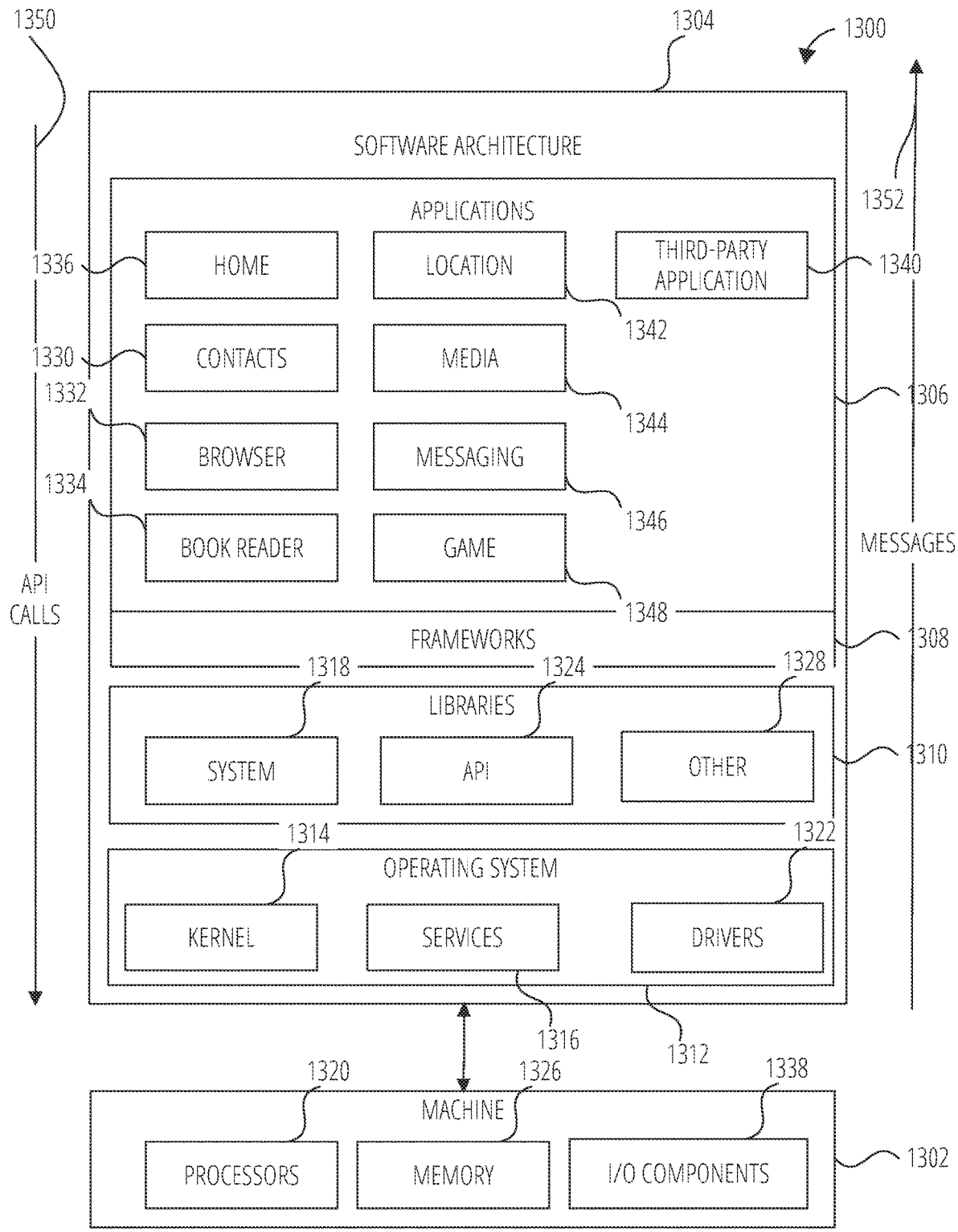
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Processing Components

Figure 14:
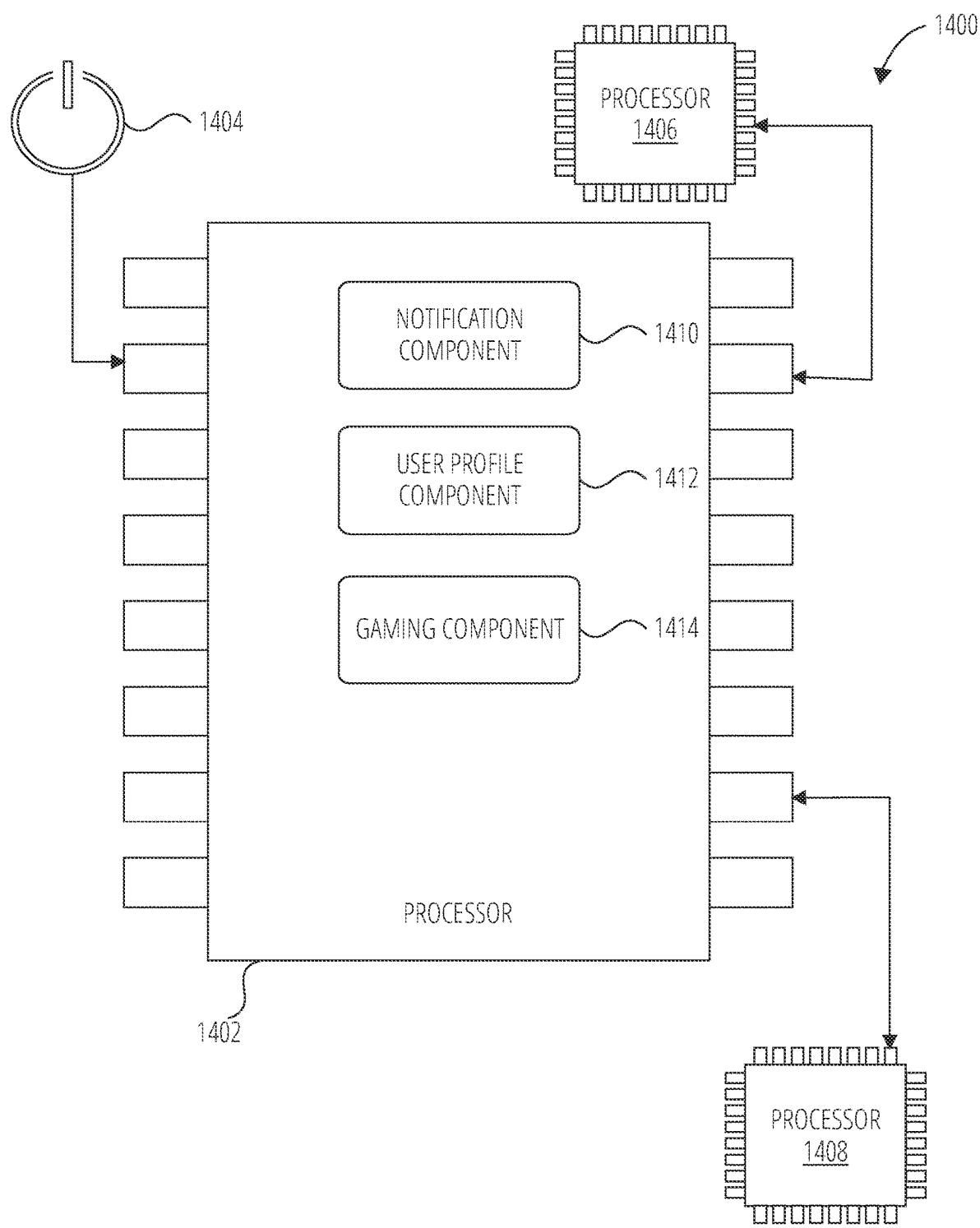
FIG. 14 is a diagrammatic representation of a processing environment, in accordance with some examples.

Turning now to FIG. 14, there is shown a diagrammatic representation of a processing environment 1400, which includes a processor 1402, a processor 1406, and a processor 1408 (e.g., a GPU, CPU or combination thereof).

The processor 1402 is shown to be coupled to a power source 1404, and to include (either permanently configured or temporarily instantiated) modules, namely a notification component 1410, a user profile component 1412, and a gaming component 1414. The notification component 1410 operationally generates notifications, the user profile component 1412 operationally accesses user profile data that includes user preferences, and the gaming component 1414 operationally provides game session functionality. As illustrated, the processor 1402 is communicatively coupled to both the processor 1406 and the processor 1408.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is provisionally claimed is:

1. A method comprising:
causing display of a graphical user interface at a client device associated with a user account, the graphical user interface including a menu element to display a list of user connections associated with the user account;
determining that a user connection from among the list of user connections is engaged in a game session; and
presenting a notification at a position proximate to a user identifier of the user connection within the menu element in response to the determining that the user connection is engaged in a game session, the notification including a display of a game title associated with the game session.

2. The method of claim 1, wherein the method further comprises:
receiving an input that selects the notification from the menu element; and
launching the game session at the client device in response to the input that selects the notification.

3. The method of claim 2, wherein the launching the game session at the client device includes:
causing the user account to join the game session of the user connection.

4. The method of claim 2, wherein the user connection is a first user connection, and the method further comprises:
receiving a selection of a second user connection from among the list of user connections associated with the user account; and
generating an invitation to join the game session in response to the selection of the second user connection.

5. The method of claim 1, wherein the determining that the user connection from among the list of user connections is engaged in the game session further comprises:
accessing a user preference associated with the user connection; and
wherein the presenting the notification within the menu element is based on the user preference.

6. The method of claim 1, wherein the user identifier includes a graphical avatar.

7. The method of claim 6, wherein the presenting the notification within the menu element further comprises:

generating an icon based on the graphical avatar associated with the user connection, and an attribute of the game title associated with the game session; and wherein the notification includes the icon.

8. A non-transitory machine-readable storage medium comprising instructions that, when executed by one or more processors of a machine, cause the machine to perform operations comprising:

causing display of a graphical user interface at a client device associated with a user account, the graphical user interface including a menu element to display a list of user connections associated with the user account;

determining that a user connection from among the list of user connections is engaged in a game session; and presenting a notification at a position proximate to a user identifier of the user connection within the menu element in response to the determining that the user connection is engaged in a game session, the notification including a display of a game title associated with the game session.

9. The non-transitory machine-readable storage medium of claim 8, wherein the operations further comprise:

receiving an input that selects the notification from the menu element; and launching the game session at the client device in response to the input that selects the notification.

10. The non-transitory machine-readable storage medium of claim 9, wherein the launching the game session at the client device includes:

causing the user account to join the game session of the user connection.

11. The non-transitory machine-readable storage medium of claim 9, wherein the user connection is a first user connection, and the operations further comprise:

receiving a selection of a second user connection from among the list of user connections associated with the user account; and generating an invitation to join the game session in response to the selection of the second user connection.

12. The non-transitory machine-readable storage medium of claim 8, wherein the determining that the user connection from among the list of user connections is engaged in the game session further comprises:

accessing a user preference associated with the user connection; and wherein the presenting the notification within the menu element is based on the user preference.

13. The non-transitory machine-readable storage medium of claim 8, wherein the user identifier includes a graphical avatar.

14. The non-transitory machine-readable storage medium of claim 13, wherein the presenting the notification within the menu element further comprises:

generating an icon based on the graphical avatar associated with the user connection, and an attribute of the game title associated with the game session; and wherein the notification includes the icon.

15. A system comprising:

a memory; and at least one hardware processor coupled to the memory and comprising instructions that causes the system to perform operations comprising:

causing display of a graphical user interface at a client device associated with a user account, the graphical user interface including a menu element to display a list of user connections associated with the user account;

determining that a user connection from among the list of user connections is engaged in a game session; and presenting a notification at a position proximate to a user identifier of the user connection within the menu element in response to the determining that the user connection is engaged in a game session, the notification including a display of a game title associated with the game session.

16. The system of claim 15, wherein the operations further comprise:

receiving an input that selects the notification from the menu element; and launching the game session at the client device in response to the input that selects the notification.

17. The system of claim 16, wherein the launching the game session at the client device includes:

causing the user account to join the game session of the user connection.

18. The system of claim 16, wherein the user connection is a first user connection, and the operations further comprise:

receiving a selection of a second user connection from among the list of user connections associated with the user account; and generating an invitation to join the game session in response to the selection of the second user connection.

19. The system of claim 15, wherein the determining that the user connection from among the list of user connections is engaged in the game session further comprises:

accessing a user preference associated with the user connection; and wherein the presenting the notification within the menu element is based on the user preference.

20. The system of claim 15, wherein the user identifier includes a graphical avatar.

* * * * *